United States Patent
Ahmed

(10) Patent No.: US 8,991,386 B2
(45) Date of Patent: Mar. 31, 2015

(54) PARALLEL TUBE BURNER WITH IMPROVED COOLING AND REDUCED SIZE

(75) Inventor: Mallik R. Ahmed, Columbus, GA (US)

(73) Assignee: Char-Broil, LLC, Columbus, GA (US)

( * ) Notice: Subject to any disclaimer, the term of this patent is extended or adjusted under 35 U.S.C. 154(b) by 1126 days.

(21) Appl. No.: 12/581,645

(22) Filed: Oct. 19, 2009

(65) Prior Publication Data

US 2010/0095951 A1      Apr. 22, 2010

Related U.S. Application Data

(60) Provisional application No. 61/106,352, filed on Oct. 17, 2008.

(51) Int. Cl.
*A47J 37/07*     (2006.01)
*A47J 37/06*     (2006.01)

(52) U.S. Cl.
CPC .......... *A47J 37/0713* (2013.01); *A47J 37/0682* (2013.01)
USPC ..................... 126/39 D; 126/39 J; 126/39 BA; 126/51; 99/339; 99/400; 99/401; 99/445; 219/401; 219/494

(58) Field of Classification Search
CPC .................................. A47J 37/07; F24C 3/08
USPC .... 126/39 D, 25 R, 39 E, 39 J; 219/399, 464; 99/446, 447
See application file for complete search history.

(56) References Cited

U.S. PATENT DOCUMENTS

| | | | | |
|---|---|---|---|---|
| 3,369,986 A | * | 2/1968 | Vadla .......................... | 204/247.4 |
| 4,480,986 A | * | 11/1984 | Nelson et al. ................... | 431/37 |
| 4,886,044 A | * | 12/1989 | Best ............................. | 126/39 C |
| 6,114,666 A | * | 9/2000 | Best ............................. | 219/411 |
| 6,267,047 B1 | * | 7/2001 | Mosher et al. .................. | 99/339 |
| 6,371,011 B1 | * | 4/2002 | Kuechler ........................ | 99/400 |
| 2006/0003279 A1 | | 1/2006 | Best | |
| 2006/0021517 A1 | | 2/2006 | Best | |
| 2008/0072890 A1 | * | 3/2008 | Best ............................. | 126/25 R |
| 2008/0121117 A1 | | 5/2008 | Best | |
| 2009/0151575 A1 | * | 6/2009 | Eisendrath ..................... | 99/340 |
| 2009/0202688 A1 | * | 8/2009 | Best ............................. | 426/240 |
| 2013/0087136 A1 | * | 4/2013 | Ahmed ........................ | 126/39 E |

FOREIGN PATENT DOCUMENTS

EP     1886606 A1     2/2008

OTHER PUBLICATIONS

International Search Report and Written Opinion for PCT/US2009/061168. Dec. 7, 2009.

* cited by examiner

*Primary Examiner* — Gregory Huson
*Assistant Examiner* — Nikhil Mashruwala
(74) *Attorney, Agent, or Firm* — Fellers, Snider, Blankenship, Bailey & Tippens, P.C.; David G. Woodral

(57) ABSTRACT

A firebox for a gas grill with an infrared re-emitter surface at the top, at least one heat shield at the bottom, and sidewalls intermediate between the heat shields and the emitter plate forming a box like structure in which multiple small cross sectional area tubes with gas burner ports on the top or sides are disposed in an array between the heat shield and the emitter plate. The heat shield below the burner tubes has openings disposed below the burner tubes to admit secondary combustion air and provide cooling of the burner tubes preventing pre-ignition.

12 Claims, 8 Drawing Sheets

PARALLEL TUBE BURNER WITH IMPROVED COOLING AND REDUCED SIZE

CROSS REFERENCE RELATED APPLICATION

This application claims priority to U.S. Provisional Application Ser. No. 61/106,352 filed Oct. 17, 2008, which is entirely incorporated herein by reference.

BACKGROUND

Outdoor barbeque grills used for cooking food are typically fired with one of three conventional heating systems. The heating systems are typically either charcoal briquettes in a smoldering condition, burners fueled with either natural gas, propane, or a similar fuel, or by means of electrical elements that may be used alone or in conjunction with a heatable radiant material. Over the years, the use of heatable radiant materials has evolved from charcoal briquettes to lava rocks, to ceramic briquettes, plates or blocks. Such a construction is shown by U.S. Pat. No. 3,277,948 or 3,561,902, to Best. Other types of radiant burners use woven ceramic mesh, woven metal wire, and perforated metal plates as described in various patents over the years. However, with the advent of new burners, emissions standards, and, of course, the safety concerns that surround outdoor cooking, the field has continued to evolve.

In conjunction with the infrared emitting apparatus, described in U.S. Patent Publication No. 2006/0002157, a radiant infrared burner is shown for use in heating a ceramic glass emitter. However, radiant infrared burners of known type of construction have various limitations including limited gas flow turn down ratio (defined as the ratio of the maximum gas flow to the minimum possible gas flow), a propensity to extinguish under windy conditions, radiant transfer of heat in a direction downward into the surrounding plenum chamber, high pressure drop across the radiant element, and high cost of fabrication. Also some radiant burners depend on mostly primary air for combustion. That is, all the air required for combustion of the gas is mixed with the gas prior to admission to the burner body. Therefore, the inlet gas-air mixture is ready for ignition and so the auto ignition point due to ambient temperature is relatively low which can cause internal fires in the burner. In addition, radiant burners have surfaces that are at temperatures of 1600 to 1800 degrees F. which are challenging to all types of materials in terms of longevity due to thermal cycles or thermal shock in the case of ceramics or high temperature corrosion in the case of metals.

Best, in US 2009/0202688, addresses many of these concerns by disclosing a method and apparatus for generating infrared radiation from convective products of combustion. Best teaches the construction of a large box underneath an appropriate infrared re-emitter in which various types of burners are shown mixing products of combustion and distributing them under the re-emitter. Various types of re-emitters are described including solid plates that route all products of combustion around the food cooking area and surfaces that have some openings in them to allow some or all products of combustion to pass through the surface into the food cooking area. In some embodiments the use of internal baffles is shown to further convert convective to radiant heat while in other embodiments these baffles are absent. In all cases the admission of secondary combustion air to the burner is substantially remote to the burner ports and the depth of the box is considerable to allow complete and uniform mixing to evenly heat the re-emitter. In some cases the high temperatures inside the box require the use of a special complex burner construction to avoid the phenomenon of pre-ignition of the primary air-gas mixture. An improvement will be shown that allows construction of a device generating infrared radiation from convective products of combustion with a much smaller depth and avoiding completely the problem of pre-ignition by employing a novel method of using secondary air required for combustion as cooling for the burner tubes.

SUMMARY OF THE INVENTION

The present disclosure relates to a burner that can be used under any type of generally horizontal surface to provide infrared emission from that horizontal surface when it is heated by the burner. The present burner provides better heat transfer by vertical impingement of hot gas on the horizontal surface, prevention of pre-ignition by directed cooling using secondary combustion air, and reduced cross sectional area using multiple lower radiation heat shields. Although a horizontal surface will be shown, it should be appreciated that this re-emitting surface could be at some angle up to as high as 15 degrees from the horizontal and still provide the characteristics shown. The present burner is also resistant to extinguishment under windy conditions and has a high gas flow turn down ratio, unlike any construction known in the prior art.

DETAILED DESCRIPTION

Figure 1:
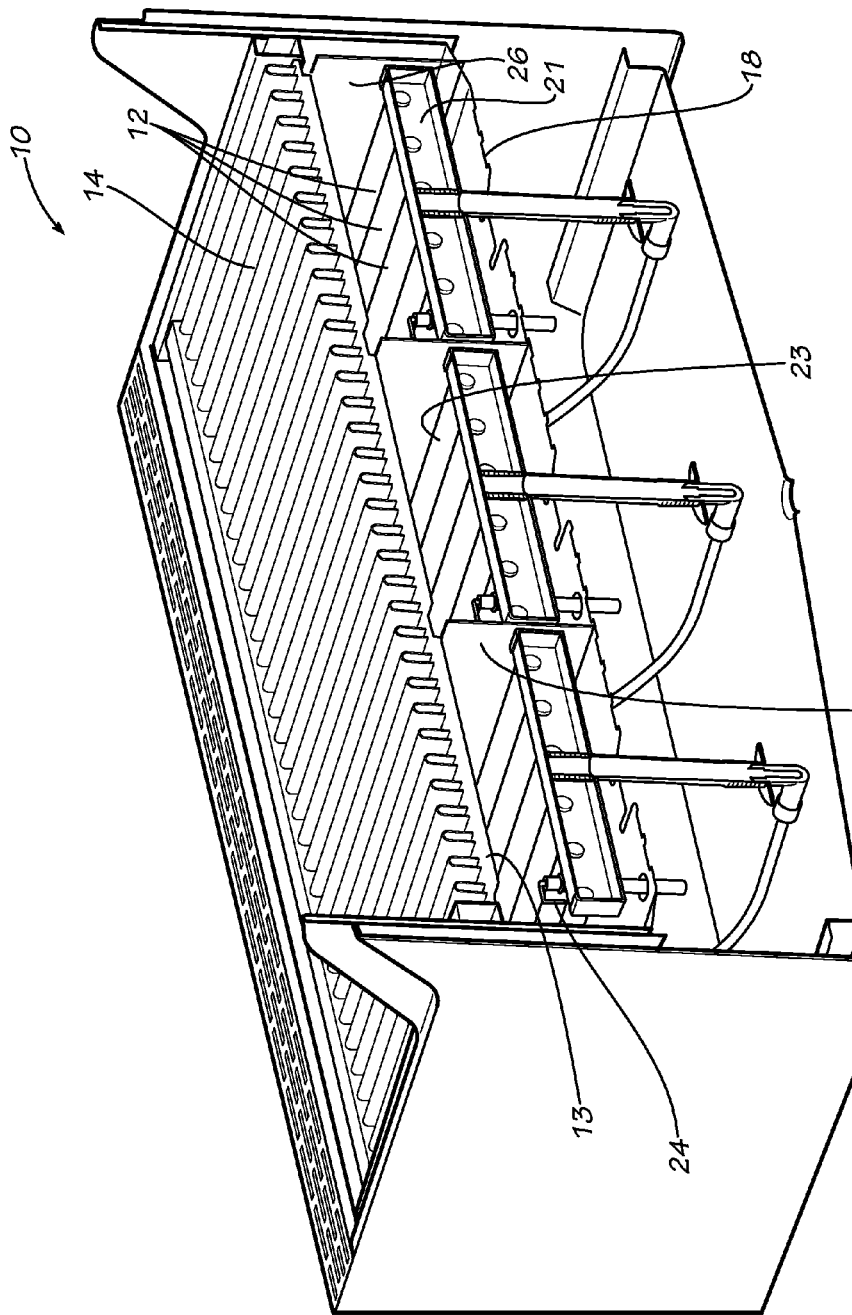
FIG. 1 is a partial, cross sectional view of the burner system installed in a conventional gas grill.

The present disclosure relates to a burner that is used to heat an infrared emitter, such as might be found in an outdoor gas barbeque grill. While the discussion which ensues will focus on the use of the burner in such an environment, such discussion should not be construed in any way to be limiting or restrictive. The present burner can be used in other types of gas fired appliances, such as stoves, water heaters, furnaces, etc. Reference is now made to the drawings, where like numbers designate like elements.

The present burner can be used under the plate and grate system that is the subject of U.S. Patent Publication No. 2006/00021517 to Best. This application discloses a stove for cooking using an infrared emitting apparatus. Such apparatus is normally heated by the radiant burner shown in U.S. Patent Publication No. 2006/0003279. Additional art for heating such an infrared emitting apparatus is taught in U.S. Patent Application 2009/0202688 A1 as noted above. However, other types of infrared emitting devices can be heated by the present burner including variations of devices disclosed in Best U.S. Pat. No. 6,114,666 or further variations.

The present burner heats the infrared emitting apparatus described in the '517 patent application, or other infrared emitting devices, by convective heat transfer instead of radiant heat transfer. The novelty of this burner comprises a number of elements. First, although convective heat transfer to the bottom of a horizontal surface is normally less efficient than by radiative means, the present burner design creates an array of small burner ports, oriented either vertically or horizontally, under the generally horizontal re-emitter surface. This creates many small areas where the velocity of the heated gas is perpendicular to the surface. This is known in the art of heat transfer to significantly increase the convective heat transfer coefficient, compared to velocity parallel to the surface, which would occur if there was a concentrated source of convective heat. It is also the case that by having small flames from the small ports, combustion is rapidly completed due the high surface to volume ratio of the flame cones. This allows the burner tubes to be placed close to the horizontal re-emitting surface without the possibility of impingement of gas in an incomplete stage of combustion on the horizontal surface, which would cause the deposit of carbon on the surface, an unacceptable burner operating characteristic. In order to provide adequate mixing as described above, burner port size was taken to 0.060" diameter which is as small as can be easily placed in a stamped or tubular burner. However smaller yet port sizes could be effectively used. The port size could be as high as 0.075" and still achieve complete combustion in a reasonable distance to allow compact construction. Above 0.100" port diameter the burner flames will be so long as to prevent achievement of the desired compact construction.

The present developments provide unexpected increases in efficiency, lower operating temperatures but with the rapid achievement of operating temperatures, and no internal burner fires. Such advantages are not found in the prior art.

Second, the use of small burner ports requires the use of small cross sectional area burner tubes to allow sufficient secondary air for combustion to reach the port area. The close spacing of the multiple small tubes to the horizontal surface and the presence of multiple radiation heat shields could lead to very high operating temperatures of the burner tubes with risk of pre-ignition. By placing the secondary air openings underneath in close proximity to the small burner tubes, the secondary air for combustion is used to cool the tubes themselves. Various alternate constructions to achieve this will be shown. In addition it will be noted that the use of many small tubes instead of a few large tubes increases the surface to volume ratio, thereby increasing the effectiveness of the secondary air cooling. In the embodiments constructed, the diameter of round burner tubes used was in the order of 0.50 inches, which represent the lower range of present manufacturing capability. Above 1.00 inches diameter, the total burner volume will begin to be excessive compared to the port openings and the virtue of compact construction will be sacrificed.

Third, placed immediately below the burner are horizontal parallel heat shields into which are placed the openings which route the secondary combustion air mentioned above around the burner tubes. These heat shields reduce heat loss from the bottom surface of the generally horizontal infrared re-emitter being heated by the convective gases by reflecting the infrared radiation back up to the horizontal surface. In addition, a characteristic of this type of burner, as with the burners taught in U.S. 2009/0202688, is that it can achieve a better turn down ratio than the radiant burners previously used in the art. The fabrication of this type of burner is relatively simple and follows very well known principles used in ported gas tube burners in a variety of industries. Reduced maintenance or replacement due to lower operating temperatures, low cost and low complexity of construction and no internal burner fires are important properties of this burner system.

Referring now more specifically to the drawings and to FIG. 1 in particular, 10 designates generally a gas barbecue grill firebox. Firebox 10 can be mounted on a cart assembly as is well known in the art, or it can be mounted in a stationary construction of appropriate material such as on a post or in an outdoor kitchen. The firebox has a front panel 11 with controls for the gas valves and also for ignition of the gas. Disposed in the firebox 10 is a parallel tube burner 12. Mounted above the burner 12 is a radiant material, such as ceramic glass or metal plate 13, which serves as the infrared emitter that is heated by the burner. Mounted above the emitter 13 is a cooking grate 14, upon which the food to be cooked is placed.

Figure 2:
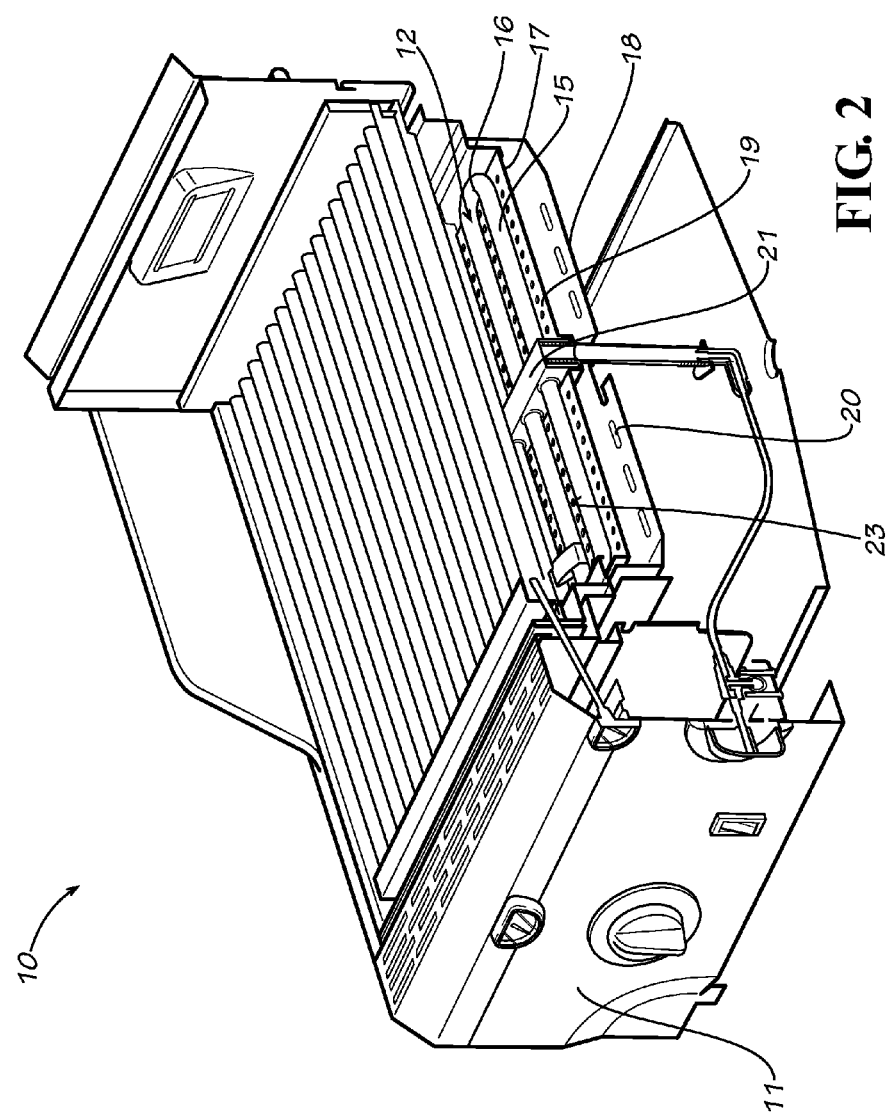
FIG. 2 is a partial longitudinal sectional view of the burner system of FIG. 1 installed in a conventional gas grill.
Figure 6:
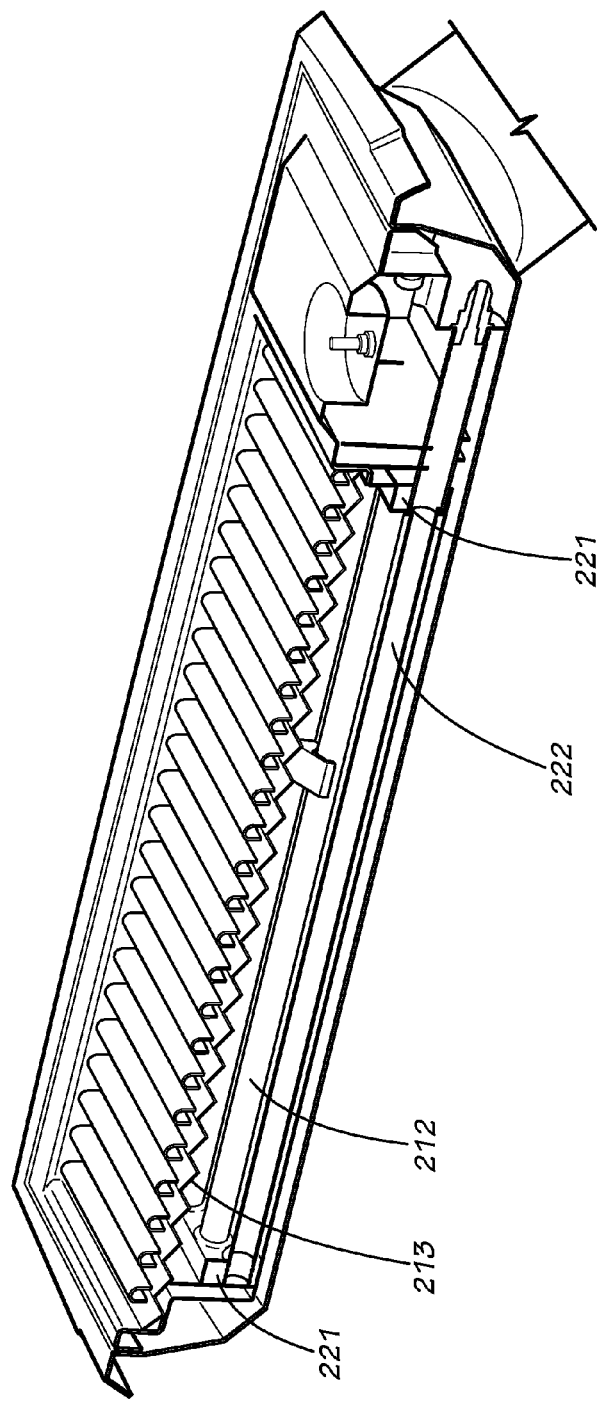
FIG. 6 is a partial longitudinal sectional view of the burner system of FIG. 5 installed.

Referring now to FIG. 2, it can be seen in the cut-away version that the burner 12 is formed in a grid like arrangement having generally parallel longitudinal members 15 that are connected at each end thereof by semi-circular conduits 16. The longitudinal members 15 can be formed continuously with the semi-circular conduits sections 16 or they can be separately formed and assembled into gas manifolds on each end 21 as shown in FIG. 6. Gas is admitted to the burner tubes by methods known to the art and illustrated in FIGS. 1 and 2 involving a control knob operating a gas valve sending propane gas through suitable conduits to an aspirator where the gas is mixed with primary combustion air and sent to a manifold 21 for distribution to the gas burner tubes 12. In the embodiment shown in FIGS. 1 and 2, no reduction in the depth of the burner system has been attempted and products of combustion are routed to the front and back of a flat plate re-radiating element.

Ignition of the gas in the burner tubes may be accomplished by use of a spark generator arcing across an electrode 24 suitably placed in proximity to the burner 12, a hot surface igniter similarly placed, and other known methods.

Further details of construction are shown in FIGS. 1 and 2. Of particular significance is the placement of the burner ports, 23, on the top surface of the burner tubes 12 and the placement of slots 19 in the heat shield 17 below the burner tubes so that secondary air needed for combustion at the burner ports is introduced by a flow around the outside of the burner tubes. This also provides a cooling effect to complement the cooling effect of the gas flow inside the burner tube, thus preventing the high temperatures obtained in the box like structure formed by emitter plate 13, the heat shield 17 and the side walls 26 of the firebox and supporting structure for the heat shields from causing pre-ignition in the burner tubes. It may be desired to add one or more additional heat shields, shown as 18 with slots 20 for secondary air flow, below the first heat shield 17. This will reduce heat transfer to the bottom of the grill and increase operating efficiency of the product. It will also be seen that vertical walls 25 can be employed between each section of burners supplied by a single valve in order to allow adjacent burners to be used at different firing rates and produce different temperatures at defined zones of the cooking grate 14.

Figure 3:
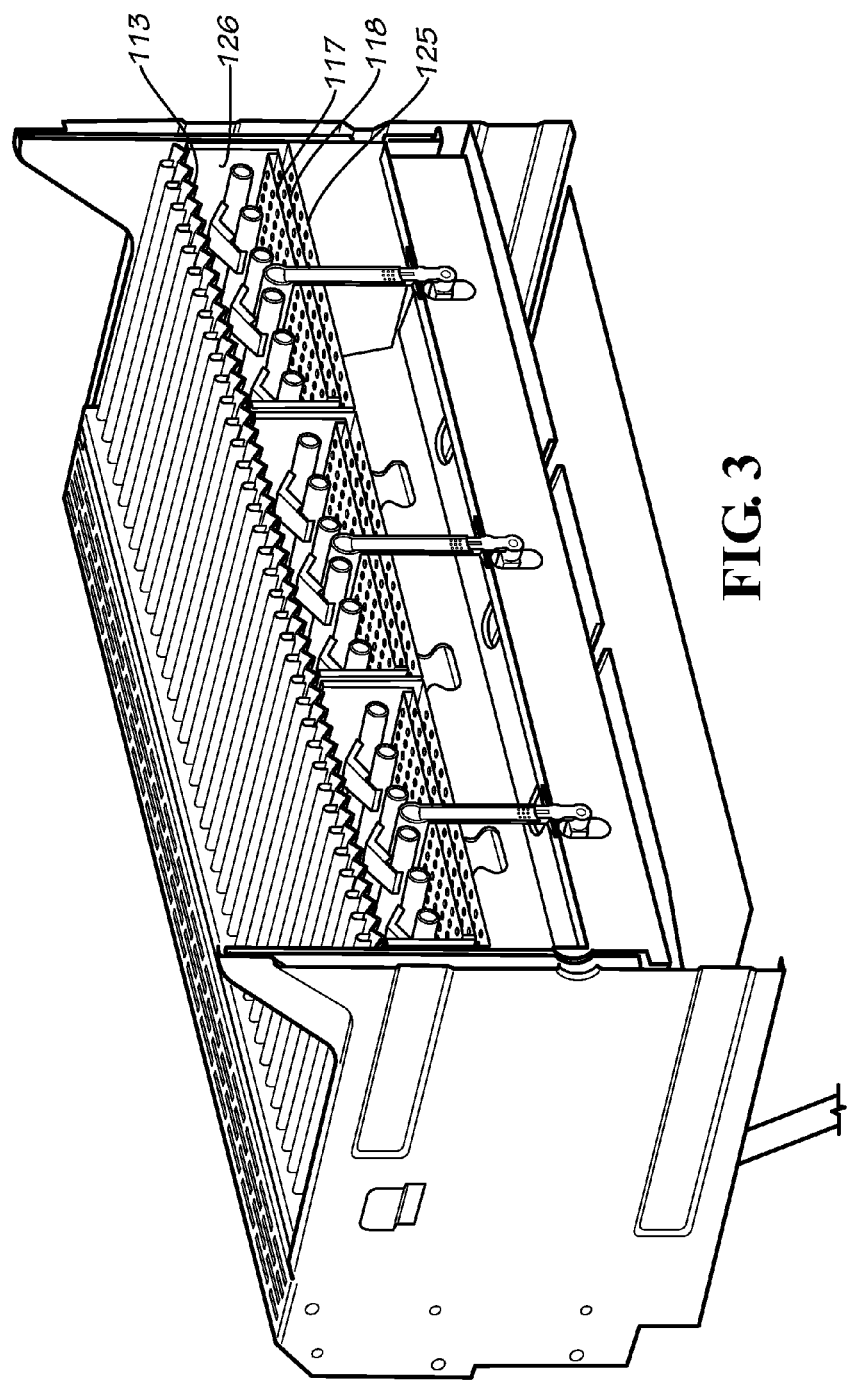
FIG. 3 is a partial cross sectional view of an alternate embodiment of the burner system installed in a conventional gas grill.
Figure 4:
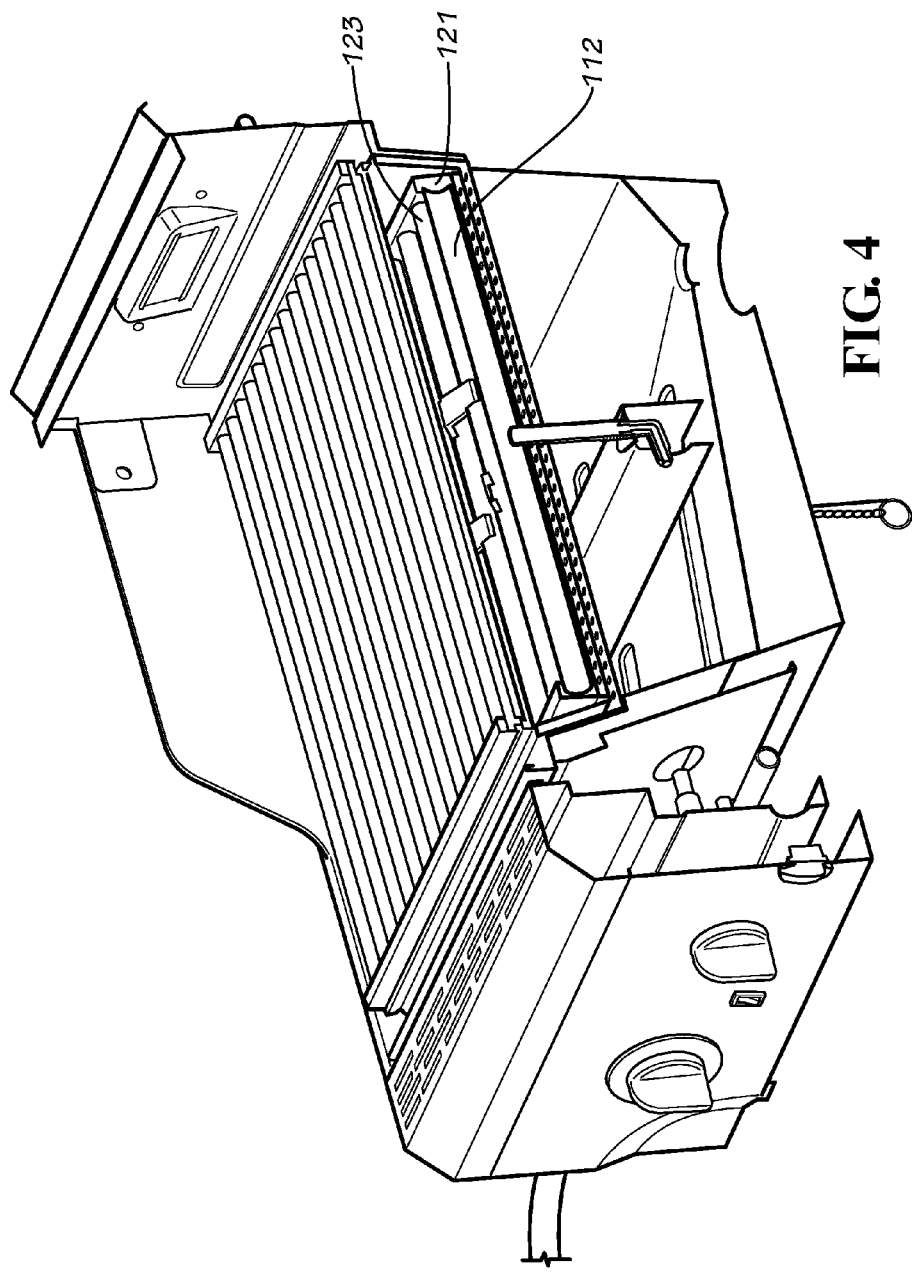
FIG. 4 is a partial longitudinal sectional view of the burner system of FIG. 3 installed.

In FIGS. 3 and 4 a version of the burner system is shown in which the depth between the infrared re-emitter 113 and the first heat shield 117 is significantly reduced, accelerating thermal response. Additional heat shields 118 and 125 are added, reducing heat transfer and increasing efficiency. In addition, the sidewall 126 is made of double construction to further minimize heat loss. Also in this embodiment, the heat re-radiant element above the burner is not a flat plate but a light gauge metal stamping which may have openings to allow passage of products of combustion through the horizontal surface. In this embodiment, the gas air mixture for combustion is fed to the burner 112 through manifold 121. Here again the burner ports 123 are on the top or upper surface of the burner tubes. To validate the effect of reducing the depth of the burner system, tests were run with a burner system designated as A configured to the design of FIGS. 1 and 2 and a burner system designated as B configured to the design of FIGS. 3 and 4. The results of these tests are shown in Table 1. The temperature of the re-emitter 13 and the top of the cooking grate 14 are shown at different times and clearly indicate the improved thermal response gained with reduced height.

TABLE 1

Comparison of warm up times

| | re-emitter | top of grate | |
|---|---|---|---|
| | System A, Lid Closed | | |
| 3 minutes | 201 | 155 | FIGS. 1 and 2 |
| 5 minutes | 360 | 175 | |
| 15 minutes | 828 | 690 | |
| 29 minutes | 1017 | 903 | |
| 75.0 Btu/hr/sq in | | | |
| Degrees F. | | | |
| | System B, Lid Closed | | |
| 3 minutes | 843 | 651 | FIGS. 3 and 4 |
| 5 minutes | 956 | 749 | |
| 15 minutes | 1130 | 990 | |
| 29 minutes | 1184 | 1044 | |

76.1 Btu/hr/sq in
Degrees F.

Figure 5:
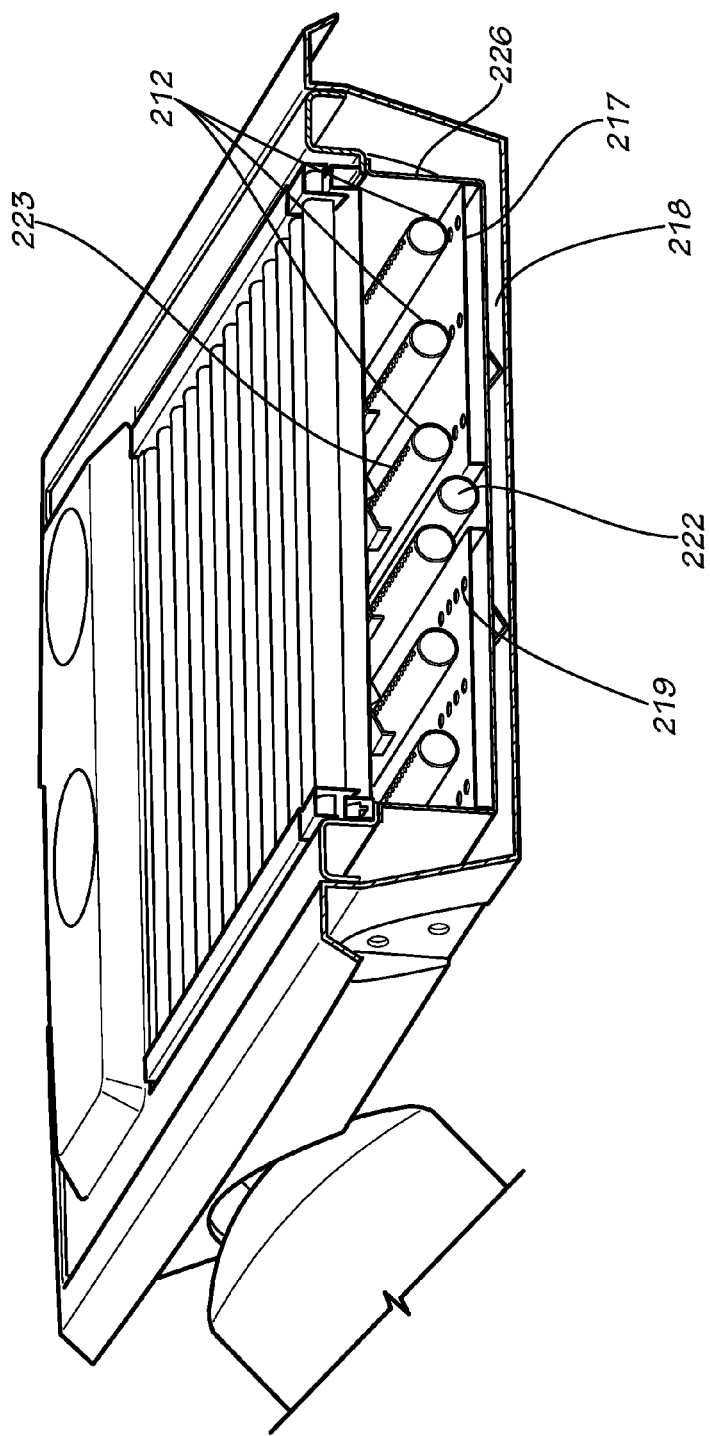
FIG. 5 is a partial cross sectional view of another alternate embodiment of the burner system.

In FIGS. 5 and 6 is shown a version of the burner system shown in a grill in which the capability of having a functional, high performance radiant cooking system in the smallest possible package is demonstrated. In this embodiment, the reduction in height of the burner is integral to the design and the heated re-radiant element above the burner is not a flat plate but a light gauge metal stamping which may have openings to allow passage of products of combustion through the horizontal surface. In order to further minimize the depth of the system the primary air/gas mixture is fed into a manifold tube 222 that is parallel to the burner tubes 212 and distributes gas to the two manifolds 221 that are at each end and perpendicular to the burner tubes 212. As the ratio of the cooking area to the total surface area of the firebox formed by the cooking area plus the bottom heat shields and the side walls increases, the heat loss to the outside is reduced.

Figure 7A:
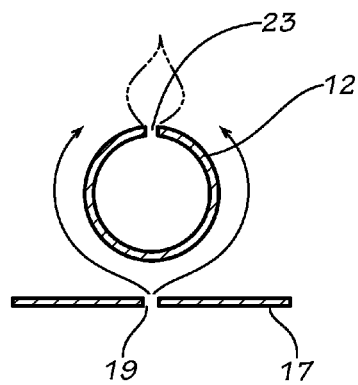
FIGS. 7A-7C show different arrangements of secondary/cooling air openings below a circular tube burner.
Figure 7B:
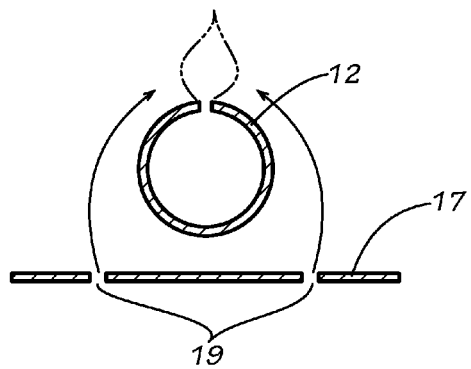
Figure 7C:
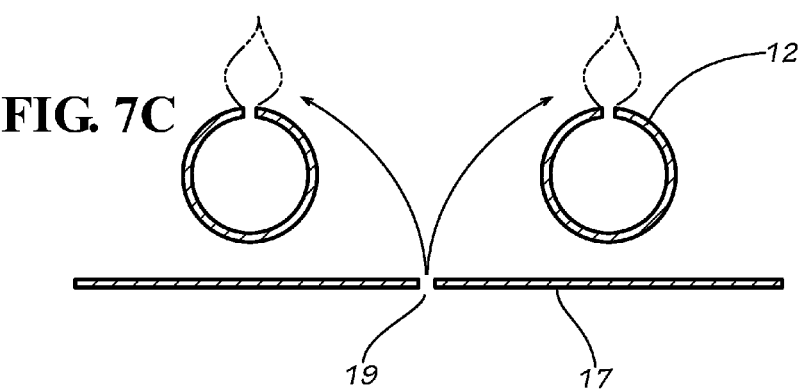

In FIGS. 7A-7C it is shown three different ways to arrange the flow of air from the openings in the heat shields to the burner. In FIG. 7A, the secondary and cooling air opening 19 is directly below the burner tube 12. Arrows show the path of the secondary air flowing to the combustion zone above the burner port 23. In FIG. 7B, the secondary and cooling air openings are to either side of the burner tube, though no further away from the centerline of the burner tube than the diameter of the burner tube. In FIG. 7C the secondary and cooling air openings comprise a single row of openings between each burner tube. The cooling effect is at a maximum in the arrangement of 7A, at a minimum in the arrangement of 7C and intermediate in the arrangement of 7B, although all these are effective.

Figure 8A:
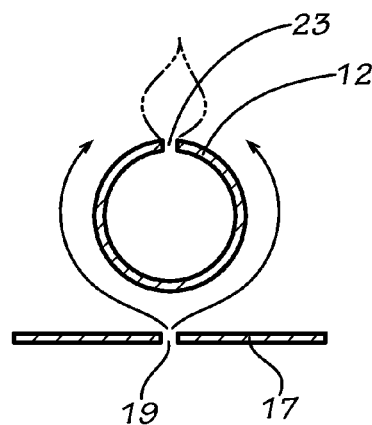
FIGS. 8A-8C show the effect of relocating the burner ports of a circular tube burner.
Figure 8B:
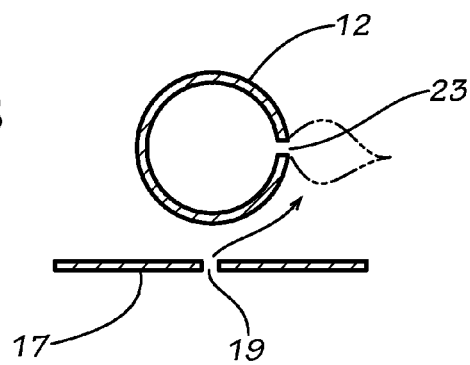
Figure 8C:
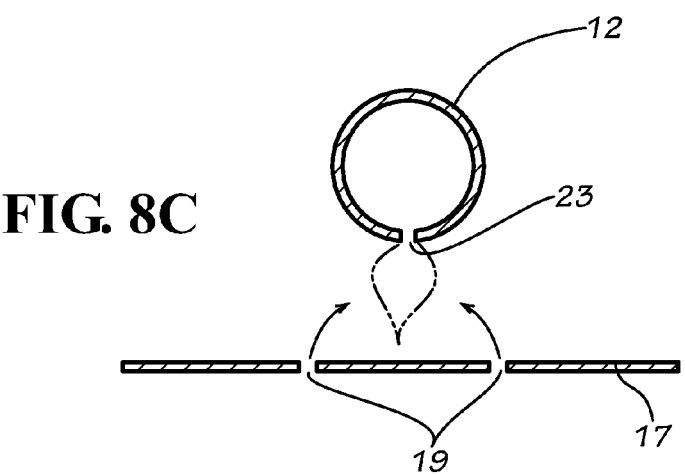

In FIGS. 8A-8C it is shown that the burner port 23, can be arranged as shown in FIG. 8B in a generally horizontal position or at any intermediate position between that of FIG. 8A and FIG. 8B. The advantage of the generally horizontal location shown in FIG. 8B is that it allows even further reduction in height of the burner system by increasing the distance between the combustion zone around the port 23 and the re-emitter surface 13, which allows the surface 13 to be moved somewhat closer to the burner tubes 12.

Another advantageous embodiment is shown in FIG. 8C. Here the burner port 23 is disposed at the bottom of the burner tube, directing the flame downwardly. In this construction, air for combustion and cooling is drawn upwardly and around the burner tube. As above, the ports can be located at any intermediate position in the lower portion of the tube 12 between that shown in FIGS. 8B and 8C. In the lower portions, this design can be used as a top and bottom broiler. With an additional tray disposed below the burner this design can be used for baking.

It will be understood that although all depictions of the burner tubes shown are of round cross section, other cross sections are possible including, for example, an ellipse with the long section arranged vertically and the burner ports at the top or an ellipse with the long section arranged horizontally with burner ports on the horizontal center line. Other advantageous constructions are possible in other cross-sectional embodiments including all of those shown in FIGS. 7A-7C and FIGS. 8A-8C, as well as intermediate positions. Similarly, various heat shield configurations may be employed if necessary to adapt to a burner having a different cross-sectional embodiment.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A firebox for a gas grill comprising an infrared re-emitter surface, at least one planar heat shield spaced apart from the re-emitter, and side walls intermediate between the heat shield and the re-emitter surface forming a box like structure in which:
   multiple small cross sectional area burner tubes with multiple small gas burner ports are disposed in an array between the heat shield and the re-emitter surface; and
   the heat shield below the burner tubes has openings disposed below the burner tubes that admit secondary combustion air and are sized and located such that they provide air cooling of the burner tubes sufficient to prevent preignition of the combustible fuel-air mixture in the burner tube prior to the exit of the combustible fuel-air mixture from the tubes through the gas ports.

2. The firebox of claim 1 in which the burner tubes are round and of diameter less than 1.00 inches.

3. The firebox of claim 1 in which the gas burner port diameter is less than 0.100 inches.

4. The firebox of claim 1 in which the openings in the heat shield disposed below the burner tubes are below and on a common centerline with the axis of the burner tubes.

5. The firebox of claim 1 in which the openings in the heat shield disposed below the burner tubes are in two parallel rows with a space in the middle underneath the centerline of the burner tubes.

6. The firebox of claim 1 in which an additional heat shield is disposed below the at least one heat shield and spaced apart from a separate bottom of the firebox.

7. The firebox of claim 1 in which said burner ports are disposed at the top of the burner tubes, thereby directing the flames upwardly toward said re-emitter surface.

8. The firebox of claim 1 in which the diameter of said burner ports is less than 0.07 inches.

9. The firebox of claim 1 in which said burner tubes have a diameter between and including 0.5 and 1.0 inches.

10. The grill of claim 6 wherein the additional heat shield provides a plurality openings disposed below the at least one heat shield to provide air thereto.

11. A gas barbecue grill having a firebox with a gas burner disposed therein and a cooking grate disposed above said burner for holding items of food to be cooked thereon, the improvement comprising an infrared horizontal re-emitter surface disposed in the firebox below said cooking grate, at least one planar heat shield disposed below said gas burner; said gas burner having a plurality of small cross-sectional area tubes below said re-emitter surface, said tube having a plurality of small diameter burner ports directed upwardly toward said re-emitter surface; and, said heat shield having openings below said tube to admit secondary combustion air and providing cooling of the at least one tube sufficient to preventing pre-ignition of the combustible fuel-air mixture in the burner tube prior to the exit of the combustible fuel-air mixture from the at least one tube through the gas ports.

12. A grill comprising:
    a firebox having a cooking surface, four sidewalls, and a bottom;
    a horizontal infrared re-emitter surface disposed below the cooking surface; and
    a burner system disposed within the four sidewalls of the firebox and interposing the infrared re-emitter surface and the bottom of the firebox, the burner system comprising:
    at least one manifold tube;
    a plurality of parallel tube burners fed from the manifold tube and each providing a plurality of spaced apart gas ports directed toward the infrared re-emitter;
    sidewalls bounding the parallel tube burners; and
    a horizontal heat shield parallel to the re-emitter and affixed to the sidewalls bounding the parallel tube burners such that at least a portion of the sidewalls are intermediate to the heat shield and the re-emitter and providing at least one row of openings parallel to each tube burner that provides air to each of the tube burners to prevent pre-ignition of combustible fuel-air mixture in the burner tube prior to exit of the combustible fuel-air mixture from the gas ports.

\* \* \* \* \*